United States Patent
Kaga

(10) Patent No.: US 12,399,385 B2
(45) Date of Patent: Aug. 26, 2025

(54) PROGRESSIVE POWER LENS AND DESIGNING METHOD THEREOF

(71) Applicant: HOYA LENS THAILAND LTD., Pathumthani (TH)

(72) Inventor: Tadashi Kaga, Tokyo (JP)

(73) Assignee: HOYA LENS THAILAND LTD., Pathumthani (TH)

(*) Notice: Subject to any disclaimer, the term of this patent is extended or adjusted under 35 U.S.C. 154(b) by 427 days.

(21) Appl. No.: 17/911,512

(22) PCT Filed: Jan. 12, 2021

(86) PCT No.: PCT/JP2021/000680
§ 371 (c)(1),
(2) Date: Sep. 14, 2022

(87) PCT Pub. No.: WO2021/186861
PCT Pub. Date: Sep. 23, 2021

(65) Prior Publication Data
US 2023/0114677 A1 Apr. 13, 2023

(30) Foreign Application Priority Data
Mar. 19, 2020 (JP) .................. 2020-049477

(51) Int. Cl.
G02C 7/02 (2006.01)
G02C 7/06 (2006.01)

(52) U.S. Cl.
CPC .............. *G02C 7/028* (2013.01); *G02C 7/027* (2013.01); *G02C 7/063* (2013.01)

(58) Field of Classification Search
CPC ........ G02C 7/027; G02C 7/028; G02C 7/063; G02C 7/06; G02C 7/061; G02C 7/065; G02C 7/066; G02C 7/024; G02C 7/041
(Continued)

(56) References Cited

U.S. PATENT DOCUMENTS

2006/0209255 A1 9/2006 Donetti et al.
2013/0027657 A1 1/2013 Esser et al.
2017/0293159 A1* 10/2017 Kozu ................. G02C 7/06

FOREIGN PATENT DOCUMENTS

EP 3 457 195 A1 3/2019
JP 2001-21846 A 1/2001
(Continued)

OTHER PUBLICATIONS

JP2001021846 Translation (Year: 2001).*
(Continued)

*Primary Examiner* — Travis S Fissel
(74) *Attorney, Agent, or Firm* — Oliff PLC

(57) ABSTRACT

A progressive power lens and a technique associated therewith, wherein $C_F$ and $Ax_F$ are achieved in a distance portion and $C_N$ and $Ax_N$ are achieved in a near portion in a state in which: a basic progressive surface on which no astigmatic power is set in the distance portion, the near portion, and an intermediate portion; a curvature distribution of a set α (k1α, k2α) of two principal curvatures having different sizes that is uniformly added to the distance portion, the near portion, and the intermediate portion, and that achieves $C_F$ and $Ax_F$ in the distance portion; and a curvature distribution of a set β (k1β, k2β) of two principal curvatures having different sizes that is different from the curvature distribution of the set α, and in which an absolute value (|k1β−k2β|) of a principal curvature difference increases in a predetermined direction, are combined.

5 Claims, 6 Drawing Sheets

(58) Field of Classification Search
USPC .................................................. 351/159.74
See application file for complete search history.

(56) References Cited

FOREIGN PATENT DOCUMENTS

| JP | 2001021846 A | * | 1/2001 |
| JP | 2013-525851 A | | 6/2013 |
| WO | 2004/042455 A1 | | 5/2004 |
| WO | 2005/019905 A1 | | 3/2005 |

OTHER PUBLICATIONS

Sep. 20, 2022 International Preliminary Report on Patentability issued in International Patent Application No. PCT/JP2021/000680.
Mar. 13, 2024 Externded European Search Report issued in European Patent Application No. 21771771.9.
Apr. 6, 2021 International Search Report issued in International Patent Application No. PCT/JP2021/000680.

* cited by examiner (a)

(b)

(c)

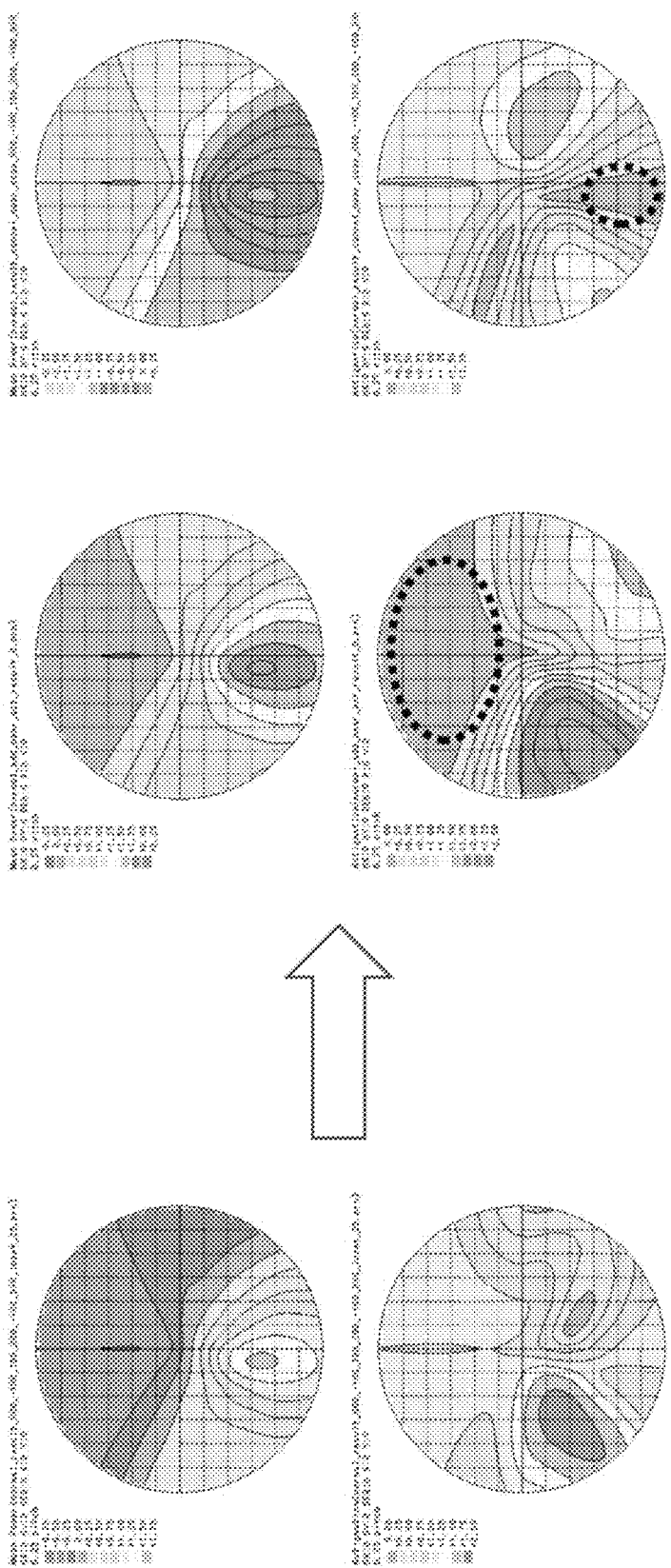

PROGRESSIVE POWER LENS AND DESIGNING METHOD THEREOF

TECHNICAL FIELD

The present invention relates to a progressive power lens and a designing method thereof.

BACKGROUND ART

Patent Document 1 describes a method for setting an astigmatic power and an astigmatic axis at two different object distances (a distance portion and a near portion) (e.g., Claim 1).

CITATION LIST

Patent Documents

Patent Document 1: JP 2013-525851A

SUMMARY OF INVENTION

Technical Problem

In the method of Patent Document 1, a spherical power, an astigmatic power, and an astigmatic axis at two different object distances are set, and the spherical power, the astigmatic power, and the astigmatic axis are determined as a function of the object distances ([0095] of Patent Document 1). However, Patent Document 1 does not disclose any specific method for developing various mathematical expressions on a surface of a progressive power lens.

An object of an embodiment of the present invention is to provide a technique that enables an astigmatic power and an astigmatic axis suitable for near vision to be freely set.

Solution to Problem

A first aspect of the present invention is a progressive power lens including:
  a lower near portion having near prescription values for near vision for viewing a near distance;
  an upper distance portion having distance prescription values for far vision for viewing a distance farther than the near distance; and
  an intermediate portion having a power that changes so as to connect the distance portion and the near portion,
  wherein a spherical power $S_F$, an astigmatic power $C_F$, and an astigmatic axis $Ax_F$ that are distance prescription values required for far vision are set in the distance portion, and a spherical power $S_N$ (=$S_F$±addition power ADD), an astigmatic power $C_N$, and an astigmatic axis $Ax_N$ that are near prescription values required for near vision are set in the near portion,
  $C_N$ is a value different from $C_F$ and/or $Ax_F$ is a value different from $Ax_N$,
  $C_F$ and $Ax_F$ are achieved in the distance portion, and $C_N$ and $Ax_N$ are achieved in the near portion in a state in which:
  a basic progressive surface on which no astigmatic power is set in the distance portion, the near portion, and the intermediate portion;
  a curvature distribution of a set α (k1α, k2α) of two principal curvatures having different sizes that is uniformly added to the distance portion, the near portion, and the intermediate portion, and that achieves $C_F$ and $Ax_F$ in the distance portion; and
  a curvature distribution of a set β (k1β, k2β) of two principal curvatures having different sizes that is different from the curvature distribution of the set α, and in which an absolute value (|k1β−k2β|) of a principal curvature difference increases in a predetermined direction,
  are combined.

A second aspect of the present invention is the aspect according to the first aspect,
  wherein the set β has a distribution that has one astigmatic axis $Ax_β$, and in which a spherical power increases from a spherical power 0 D to a spherical power $S_β$, and an astigmatic power increases from an astigmatic power 0 D to an astigmatic power $C_β$, and
  $S_β$, $C_β$, and $Ax_β$ are determined by the following procedures:

[Procedure 1]
  the distance prescription values of the distance portion are subtracted from the near prescription values of the near portion by vector subtraction, to calculate a spherical power $S_{β1}$, an astigmatic power $C_{β1}$, and an astigmatic axis $Ax_{β1}$; and

[Procedure 2]
  (1) if an increasing/decreasing direction T, obtained by subtracting 90 degrees from the astigmatic axis $Ax_{β1}$ (if the increasing/decreasing direction T is less than 0 degrees, a value obtained by adding 180 degrees thereto), of the astigmatic power is outside a range of 45 to 135 degrees, $S_{β1}$ and $C_{β1}$ are converted into a state in which a value of the astigmatic axis $Ax_{β1}$ is replaced with a value of the increasing/decreasing direction T of the astigmatic power, to calculate a post-conversion spherical power $S_{β2}$ and a post-conversion astigmatic power $C_{β2}$, and $S_{β2}$ is set to $S_β$, $C_{β2}$ is set to $C_β$, and $Ax_{β1}$ is set to $Ax_β$, and
  (2) if the increasing/decreasing direction T, obtained by subtracting 90 degrees from the astigmatic axis $Ax_{β1}$ (if the increasing/decreasing direction T is less than 0 degrees, a value obtained by adding 180 degrees thereto), of the astigmatic power is in the range of 45 to 135 degrees, $S_{β1}$ is set to $S_β$, $C_{β1}$ is set to $C_β$, and $Ax_{β1}$ is set to $Ax_β$.

A third aspect of the present invention is the aspect according to the first or second aspect, and is a designing method of a progressive power lens including:
  a lower near portion having near prescription values for near vision for viewing a near distance;
  an upper distance portion having distance prescription values for far vision for viewing a distance farther than the near distance; and
  an intermediate portion having a power that changes so as to connect the distance portion and the near portion,
  wherein a spherical power $S_F$, an astigmatic power $C_F$, and an astigmatic axis $Ax_F$ that are distance prescription values required for far vision are set in the distance portion, and a spherical power $S_N$ (=$S_F$+addition power ADD), an astigmatic power $C_N$, and an astigmatic axis $Ax_N$ that are near prescription values required for near vision are set in the near portion, and
  $C_N$ is a value different from $C_F$ and/or $Ax_F$ is a value different from $Ax_N$, the designing method including:
  a set α adding step of uniformly adding, to the distance portion, the near portion, and the intermediate portion, a curvature distribution of a set α (k1α, k2α) of two principal curvatures having different sizes that achieves $C_F$ and $Ax_F$ in the distance portion; and a set β adding step of adding a curvature distribution of a set β (k1β, k2β) of two principal curvatures having different sizes that is different from the curvature distribution of the set α, and in which an absolute value (|k1β−k2β|) of a principal curvature difference increases in a predetermined direction, wherein, after the set α adding step and the set β adding step have been performed on a basic progressive surface on which no astigmatic power is set in the distance portion, the near portion, and the intermediate portion, the set β has a curvature distribution that is capable of achieving $C_F$ and $Ax_F$ in the distance portion, and capable of achieving $C_N$ and $Ax_N$ in the near portion.

A fourth aspect of the present invention is the aspect according to the third aspect, further including, before the set α adding step and the set β adding step, a preparation step of preparing a basic progressive surface including the distance portion, the near portion, and the intermediate portion before the distance portion, the near portion, and the intermediate portion are each provided with a power for astigmatism correction; and a calculation step of subtracting the distance prescription values of the distance portion from the near prescription values of the near portion by vector subtraction, to calculate a spherical power $S_{\beta 1}$, an astigmatic power $C_{\beta 1}$, and an astigmatic axis $Ax_{\beta 1}$, wherein, if an increasing/decreasing direction T, obtained by subtracting 90 degrees from the astigmatic axis $Ax_{\beta 1}$ (if the increasing/decreasing direction T is less than 0 degrees, a value obtained by adding 180 degrees thereto), of the astigmatic power is outside a range of 45 to 135 degrees, a conversion step of converting $S_{\beta 1}$ and $C_{\beta 1}$ into a state in which a value of the astigmatic axis $Ax_{\beta 1}$ is replaced with a value of the increasing/decreasing direction T of the astigmatic power, to calculate a post-conversion spherical power $S_{\beta 2}$ and a post-conversion astigmatic power $C_{\beta 2}$ is performed, and $S_{\beta 2}$ is set to $S_\beta$, $C_{\beta 2}$ is set to $C_\beta$, and $Ax_{\beta 1}$ is set to $Ax_\beta$, and, if the increasing/decreasing direction T, obtained by subtracting 90 degrees from the astigmatic axis $Ax_{\beta 1}$ (if the increasing/decreasing direction T is less than 0 degrees, a value obtained by adding 180 degrees thereto), of the astigmatic power is in the range of 45 to 135 degrees, $S_{\beta 1}$ is set to $S_\beta$, $C_{\beta 1}$ is set to $C_\beta$, and $Ax_{\beta 1}$ is set to $Ax_\beta$, and, after performing a set β obtaining step of obtaining a set β having a curvature distribution that has one astigmatic axis $Ax_\beta$, and in which a spherical power increases from a spherical power 0 D to a spherical power $S_\beta$, and an astigmatic power increases from an astigmatic power 0) to an astigmatic power $C_\beta$, the set α adding step and the set β adding step are performed on the basic progressive surface.

A fifth aspect of the present invention is the aspect according to the third or fourth aspect, wherein, after the set β adding step, the set α adding step is performed.

Other aspects of the present invention that can be combined with the above-described aspects are as follows.

Examples thereof include a progressive power lens set including: the above-described progressive power lens; and recording means having recorded therein at least a spherical power $S_F$ required for far vision, an astigmatic power $C_F$ required for far vision, and an astigmatic axis $Ax_F$ of $C_F$, an addition power ADD, an astigmatic power $C_N$ required for near vision, and an astigmatic axis $Ax_N$ of $C_N$.

The absolute value of $C_N$ is preferably 2.00 D or less (more preferably less than 2.00 D), and $Ax_N$ is preferably 0 degrees or more and 45 degrees or less, and more preferably 30 degrees or less (further preferably less than 30 degrees).

The astigmatism β is not added to the distance portion, and is added to the intermediate portion and the near portion.

In at least a portion of the distribution of the astigmatism β, the astigmatism increases as a linear function in the increasing direction of the astigmatic power.

Contours of the distribution of the astigmatism β are straight lines that are parallel to each other and extend in a direction perpendicular to the increasing direction of the astigmatic power.

In the calculation step, it is preferable to perform the following operations.

Decomposing the distance prescription values required for far vision into sectional powers in four directions of $D1_F$ to $D4_F$ Decomposing the near prescription values required for near vision into sectional powers in four directions of $D1_N$ to $D4_N$.

Subtracting the sectional powers in four directions for far vision from the sectional powers in four directions for near vision, to obtain D1 to D4.

Inversely converting D1 to D4 into S, C, and Ax, to obtain $S_{\beta 1}$, $C_{\beta 1}$, and $Ax_{\beta 1}$.

If there is a difference between $S_{\beta 2}$ and $S_{\beta 1}$, adjustment for making up for the difference by a change in power caused by the set β is performed, thus eventually obtaining a power that matches the prescription value.

A preferred example of the distribution in which the spherical power increases from a spherical power 0 D to a spherical power $S_\beta$ is a distribution of an average refractive power β in which a spherical power 0 D is set at the position of a measurement point F, and a spherical power $C_\beta$ is set at the position of a measurement point N.

A preferred example of the distribution in which the astigmatic power increases from an astigmatic power 0 D to an astigmatic power $C_\beta$ is a distribution of an astigmatism β in which an astigmatic power 0 D is set at the position of the measurement point F, and an astigmatic power $S_\beta$ is set at the position of the measurement point N.

An average refractive power distribution in which the refractive power is increased from the vertically upper side to the vertically lower side is prepared. An astigmatism distribution is also prepared in the same manner. Then, the two distributions are rotated about an optical center OC so as to achieve an astigmatic axis $Ax_\beta$. Thus, a distribution of the astigmatism β is obtained.

Using the expression "astigmatism", the progressive power lens according to one aspect of the present invention is as follows.

"A progressive power lens including:

a lower near portion having near prescription values for near vision for viewing a near distance;

an upper distance portion having distance prescription values for far vision for viewing a distance farther than the near distance; and an intermediate portion having a power that changes so as to connect the distance portion and the near portion, wherein a spherical power $S_F$, an astigmatic power $C_F$, and an astigmatic axis $Ax_F$ that are distance prescription values required for far vision are set in the distance portion, and a spherical power $S_N$ (=$S_F$+addition power ADD), an astigmatic power $C_N$, and an astigmatic axis $Ax_N$ that are near prescription values required for near vision are set in the near portion, $C_N$ is a value different from $C_F$ and/or $Ax_F$ is a value different from $Ax_N$, $C_F$ and $Ax_F$ are achieved in the distance portion, and $C_N$ and $Ax_N$ are achieved in the near portion in a state in which:

a basic progressive surface on which no astigmatic power is set in the distance portion, the near portion, and the intermediate portion;

an astigmatism α that achieves $C_F$ and $Ax_F$ in the distance portion and is uniformly added to the distance portion, the near portion, and the intermediate portion; and an astigmatism β that is different from the astigmatism α, and in which an astigmatism increases in a predetermined direction, are combined.

Advantageous Effects of Invention

According to an embodiment of the present invention, it is possible to provide a technique that enables an astigmatic power and an astigmatic axis suitable for near vision to be freely set.

BRIEF DESCRIPTION OF DRAWINGS

FIG. 7 is an explanatory diagram showing that the progressive power lens obtained in Example 1 has achieved distance prescription values and near prescription values.

DESCRIPTION OF EMBODIMENTS

Definitions

Figure 1:
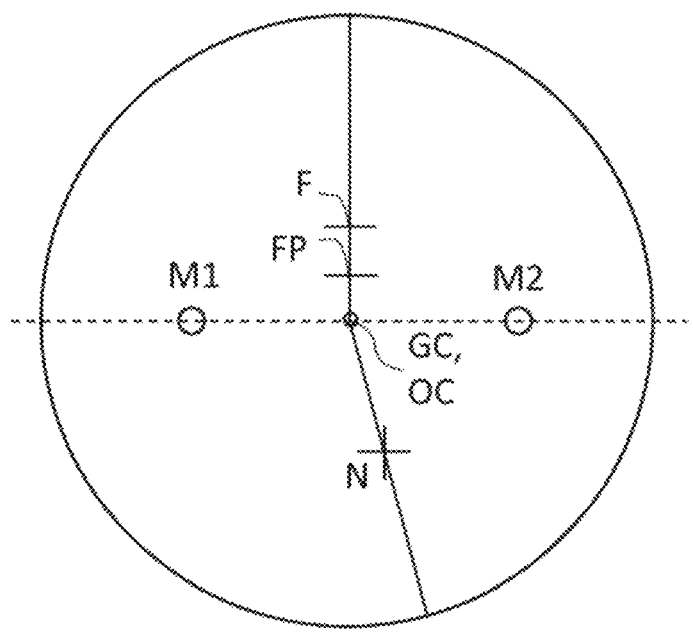
FIG. 1 is a schematic diagram for illustrating a progressive power lens.

FIG. 1 is a schematic diagram for illustrating a progressive power lens.

The term "to" as used in the present specification refers to a predetermined numerical value or more and a predetermined numerical value or less.

A progressive power lens according to one aspect of the present invention has an object-side surface and an eyeball-side surface. The term "object-side surface" refers to a surface located on the object side when a spectacle including the progressive power lens is worn by a wearer, and the term "eyeball-side surface" refers to a surface located opposite thereto, or in other words, on the eyeball side when the spectacle including the progressive power lens is worn by the wearer.

The progressive power lens includes, as regions, a portion that is provided in an upper portion of the lens in the drawing and that has a refractive power for viewing a distant object, or in other words, a distance portion having a refractive power used for far vision, a portion that is provided in a lower portion of the lens in the drawing and that has a refractive power for viewing a near object, or in other words, a near portion having a refractive power used for near vision, and an intermediate portion provided between the distance portion and the near portion, and the refractive power of the progressive lens gradually changes between the distance portion and the near portion.

A region that is present mainly in the intermediate portion and in which the refractive power gradually changes is referred to as a corridor. A corridor length is defined as a distance between a starting point of progression at which the change in refractive power starts and an endpoint of progression at which the change in refractive power ends.

The distance portion is a region of the progressive power lens that constitutes the starting point of progression and a portion located above the starting point of progression. In general, the near portion is a region of the progressive power lens that includes the endpoint of progression and a portion locate therebelow. The intermediate portion is a region that is located between the distance portion and the near portion, and in which the refractive power changes progressively.

In the distance portion, the refractive power is substantially constant. A spherical power $S_F$ (distance power) and an astigmatic power $C_F$ are set at a distance portion measurement reference point F disposed in the distance portion. When $C_F$ is other than 0 D, an astigmatic axis $Ax_F$ is set.

Figure 2:
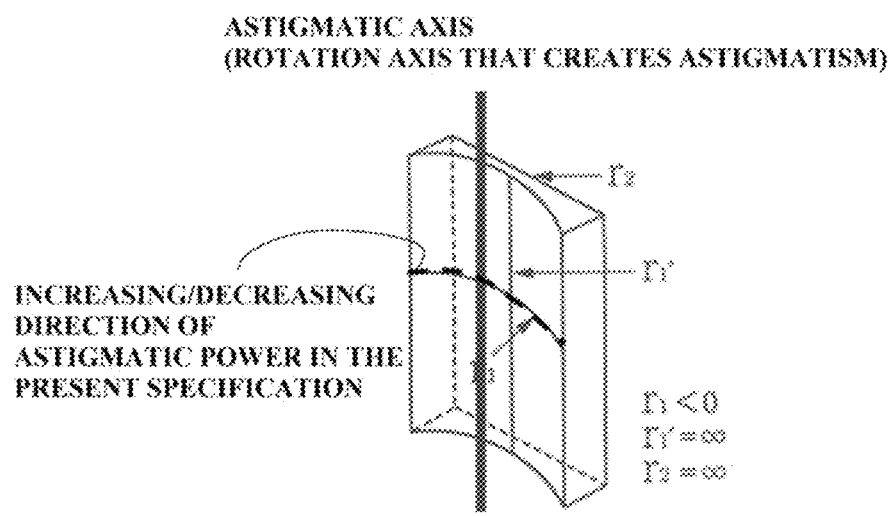
FIG. 2 is a diagram illustrating a relationship between an astigmatic axis and an increasing/decreasing direction of an astigmatic power in the present specification.

FIG. 2 is a diagram illustrating a relationship between an astigmatic axis and an increasing/decreasing direction of an astigmatic power in the present specification.

The astigmatic axis in the present specification is set in the range of 0 to 180 degrees. However, 180 degrees is regarded as the same as 0 degrees. In the present specification, the astigmatic axis and the increasing/decreasing direction of the astigmatic power that is a direction perpendicular to the astigmatic axis are defined as degrees, with a horizontal straight line passing through an optical center OC and located on the ear side as viewed from the wearer being set to 0 degrees, and a counterclockwise direction being set as a forward direction.

Although the increasing/decreasing direction of the astigmatic power is set to 150 degrees, for example, in a specific example described below, 150 degrees, precisely, is a decreasing direction of the astigmatic power, and −30 degrees, which is the direct opposite thereof, is an increasing direction of the astigmatic power. 150 degrees and −30 degrees may also be collectively referred to as an increasing/decreasing direction.

Although another parameter such as a prismatic power A may be set, the description of the other parameter has been omitted in one aspect of the present invention.

In the near portion, the refractive power is substantially constant in order to view a near distance object. At a near portion measurement reference point N disposed in the near portion, a power obtained by adding an addition power ADD to the spherical power $S_F$ is set as a near power. In one aspect of the present invention, an astigmatic power $C_N$ suitable for near vision is set. When $C_N$ is other than 0), an astigmatic axis $Ax_N$ is set. Note that the spherical power $S_N(=S_F+$ addition power ADD), the astigmatic power $C_N$, and the astigmatic axis $Ax_N$ are collectively referred to as near prescription values. For the sake of convenience of description, the near prescription values include an addition power ADD in the present specification.

In the intermediate portion, the refractive power changes gradually. A difference between the refractive power for viewing a distant object and the refractive power for viewing a near object is referred to as an addition power ADD.

The distance portion is not particularly limited as long as it is a region for viewing a distance farther than the near distance. For example, the distance portion may be a region for viewing a predetermined distance (about 1 in), rather than infinity. Examples of the spectacle lens including such a region include an intermediate-near lens corresponding to an object distance of an intermediate distance (1 m to 40 cm) to a near distance (40 cm to 10 cm), and a near-near lens corresponding to the near distance. Note that the spherical power $S_F$, the astigmatic power $C_F$, and the astigmatic axis $Ax_F$ are collectively referred to as distance prescription values.

In the present specification, a case is illustrated where $C_N$ is a value different from $C_F$, and/or $Ax_F$ is a value different from $Ax_N$. That is, a case is illustrated where the content relating to astigmatism in the distance prescription values and the content relating to astigmatism in the near prescription values are not completely the same.

An astigmatism is a value obtained by subtracting a minimum refractive power from a maximum refractive power at a predetermined location on a progressive power lens.

In the present specification, an astigmatism can also be expressed as a curvature of a set of two principal curvatures having different sizes. The term "set of two principal curvatures having different sizes" refers to a set composed of a maximum refractive power direction and a minimum refractive power direction.

A principal line of sight in one aspect of the present invention, as its name indicates, refers to a line formed by a collection of portions through which the line of sight passes in the progressive power lens when the wearer wearing the progressive power lens moves the line of sight from the top in the top-bottom direction (hereinafter referred to as an tipper side) to the bottom in the top-bottom direction (hereinafter referred to as a lower side). The principal line of sight is the basis on which the progressive power lens is designed.

A meridian refers to a vertical line that is orthogonal to a horizontal line connecting the positions of two hidden marks provided on the progressive power lens, and that passes through a midpoint of the positions of the two hidden marks. The meridian corresponds to the y axis of the distribution maps shown in the drawings of the present application.

A y direction as referred to in the present specification is a direction along the meridian, and is a vertical direction. The upper side of the lens in the worn state is a −y direction, and the lower side of the lens is a −y direction. An x direction is a direction orthogonal to the meridian, and is a horizontal direction. When facing the wearer, the right side of the lens is a +x direction, and the left side of the lens is a −x direction.

A distance power measurement point refers to a point at which a spherical refractive power and a columnar refractive power that are described in prescription data of wearer information are given to the progressive power lens. The spherical refractive power refers to a so-called spherical power S, and the columnar refractive power refers to a so-called astigmatic power C. A distance portion measurement point (hereinafter also simply referred to as a measurement point F or point F) is located on, for example, the meridian, and is located at a position 8.0 mm away from the horizontal line connecting the positions of two hidden marks M1 and M2 toward the distance portion side.

A fitting point or eye point (typically, FP) is a position through which the line of sight passe when facing right in front while the progressive power lens is worn. In general, the FP is disposed at a position few millimeters below the point F. The change in the refractive power is caused in a portion below the FP. The position at which the change in progressive power starts is also referred to as a starting point of progression. In one aspect of the present invention, a geometrical center GC located further below the FP and the starting point of progression are made coincided with each other, which are also made coincided with a prism reference point.

A near power measurement point N refers to a point in a state in which an addition power ADD is added to a spherical refractive power that is described in the prescription data of the wearer information, and refers to a point at which a spherical refractive power+ADD is first achieved when viewing from the upper side to the lower side of the lens. A near portion measurement point (hereinafter also simply referred to as a measurement point N or point N) is also located on the principal line of sight.

The term "basic progressive surface" in the present specification refers to an object-side surface or an eyeball-side surface including the distance portion, the near portion, and the intermediate portion in a state in which no astigmatic power is set therein.

In the basic progressive surface, the upper distance portion and the lower near portion are relatively wide, and the intermediate portion is relatively narrow, and thus the astigmatism on the principal line of sight is suppressed relatively low. For example, the aforementioned astigmatism is suppressed to less than 0.25 D. In other words, a surface having these features can be regarded as a basic progressive surface.

When the progressive power lens uses the double-sided progressive system, a progressive surface in a state in which an average refractive power distribution and surface astigmatisms of both sides are combined is used as a basic progressive surface.

The expression "an astigmatic power $C_N$ and an astigmatic axis $Ax_N$ required for near vision are achieved" in the present specification means that the astigmatic power $C_N$ and the astigmatic axis $Ax_N$ are detected when power measurement is performed at the measurement point N.

Similarly, the expression "an astigmatic power $C_F$ and an astigmatic axis $Ax_F$ required for far vision are achieved" in the present specification means that the astigmatic power $C_F$ and the astigmatic axis $Ax_F$ are detected when power measurement is performed at the measurement point F.

The principal line of sight may be assumed to be a straight line connecting the point F and the point N.

The positions of the measurement point F, the fitting point or eye point FP, and the measurement point N can be specified by referring to a remark chart or a centration chart issued by the lens manufacturer.

Note that the above-described horizontal direction coincides with the direction of a horizontal reference line connecting two alignment reference marks (so-called hidden marks M1 and M2) for fitting into the frame. The horizontal reference line is a line extending horizontally at a midpoint between the tipper vertex and the lower vertex of a progressive power lens (round lens before being fitted into the frame). In one aspect of the present invention, an example is described in which the two hidden marks M1 and M2 are arranged such that the principal line of sight passes through the center of the horizontal reference line connecting the hidden marks M1 and M2.

Meanwhile, the prescription data of the wearer information is described in the lens bag of the progressive power lens. That is, if the lens bag is available, it is possible to specify the progressive power lens as an object based on the prescription data of the wearer information. The progressive power lens is usually available as a set with a lens bag. Accordingly, the progressive power lens to which a lens bag is attached also reflects the technical idea of the present invention, and the same applies to a set of the lens bag and the progressive power lens.

Note that the expression "recording means" (hereinafter exemplified by a specification) is used as a concept including a lens bag. The specification need only describe at least a spherical power $S_F$ required for far vision, an astigmatic power $C_F$ required for far vision, an addition power ADD, an astigmatic power $C_N$ required for near vision, and an astigmatic axis $Ax_N$. These parameters may be described in one specification, or may be described separately in a plurality of specifications.

<Designing Method of Progressive Power Lens According to One Aspect of the Present Invention>

Figure 3:
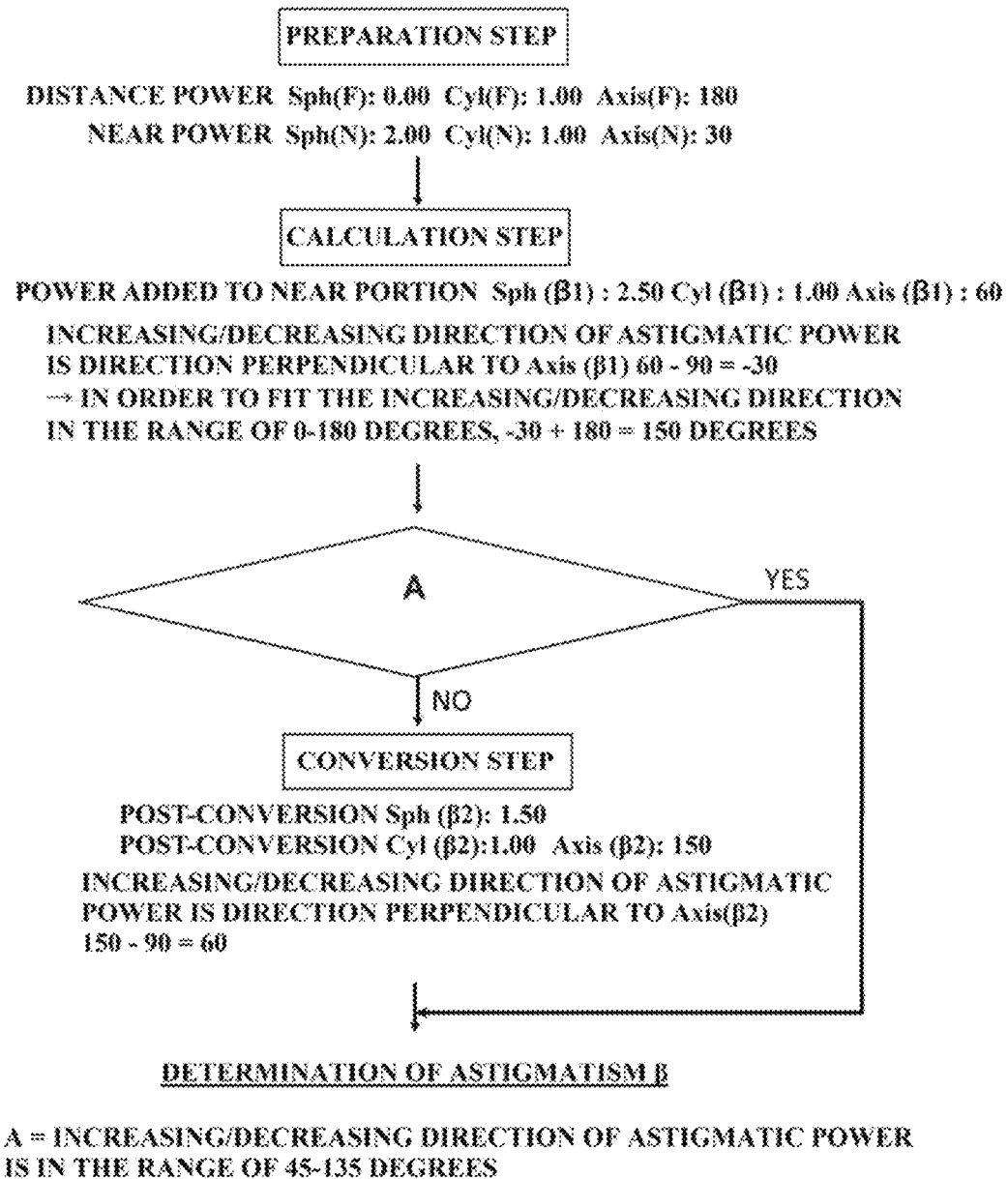
FIG. 3 is a flowchart for illustrating a designing method of a progressive power lens according to one aspect and Example 1 of the present invention.

FIG. 3 is a flowchart for illustrating a designing method of a progressive power lens according to one aspect of the present invention.

One aspect of the present invention is as follows.

"A designing method including:

a set α adding step of uniformly adding, to the distance portion, the near portion, and the intermediate portion, a curvature distribution of a set α (k1α, k2α) of two principal curvatures having different sizes that achieves $C_F$ and $Ax_F$ in the distance portion; and a set β adding step of adding a curvature distribution of a set β (k1β, k2β) of two principal curvatures having different sizes that is different from the curvature distribution of the set α, wherein, after the set α adding step and the set β adding step have been performed on a basic progressive surface on which no astigmatic power is set in the distance portion, the near portion, and the intermediate portion, the set β has a curvature distribution that is capable of achieving $C_F$ and $Ax_F$ in the distance portion, and capable of achieving $C_N$ and $Ax_N$ in the near portion."

That is, a feature of one aspect of the present invention is to perform the set α adding step and the set β adding step.

Hereinafter, for the sake of convenience of description, a set of principal curvatures is represented by an astigmatism.

The set α has a curvature distribution of a set (k1α, k2α) of two principal curvatures having different sizes.

The set β has a curvature distribution of a set (k1β, k2β) of two principal curvatures having different sizes.

The set α adding step refers to an astigmatism α adding step, and the set β adding step refers to an astigmatism β adding step.

In the astigmatism α adding step, an astigmatism α having a distribution that achieves the astigmatic power $C_F$ required for far vision and the astigmatic axis $Ax_F$ is added not only to the distance portion, but also to the near portion and the intermediate portion. In other words, an astigmatism α having a uniform distribution is added so as to include the entire portion that has an optical function on at least one surface of the progressive power lens. Specifically, the portion to which the astigmatism α is added may be a portion of the progressive power lens that is other than a peripheral edge portion, which is likely to be affected by a manufacturing error, but may include the peripheral edge portion.

The term "uniform distribution" means that an astigmatism distribution has one astigmatic power $C_F$ and one astigmatic axis $Ax_F$. The astigmatism α is a conventional astigmatism for astigmatism correction, and a known astigmatism distribution as an astigmatism correction surface may be used.

In the astigmatism β adding step, an astigmatism β that is an astigmatism different from the astigmatism α, and that has a distribution in which the astigmatism increases in a predetermined direction is added.

The term "astigmatism different from the astigmatism α" refers to an astigmatism prepared separately from the astigmatism α. After the astigmatism β and the astigmatism α have been combined on the basic progressive surface, the astigmatism distribution remaining after subtracting the astigmatism α and further subtracting the originally set basic progressive surface is the astigmatism β.

Specific embodiments of the increase in astigmatism will be discussed in <Preferred Examples and Modifications of Designing Method of Progressive Power Lens According to One Aspect of the Present Invention> and items in Example, which will be described below.

As a result of the above-described basic progressive surface, the above-described astigmatism α, and the above-described astigmatism β having been combined, the distance prescription values (i.e., $S_F$, $C_F$, and $Ax_F$) are achieved in the distance portion, and the near prescription values (i.e., $S_N$, $C_N$, and $Ax_N$) are achieved in the near portion. In other words, as long as such an astigmatism β is achieved, there is no limitation on the astigmatism β. As long as such an astigmatism β can be achieved, there is no limitation on the direction in which the absolute value (|k1β−k2β|) of the principal curvature difference increases in the curvature distribution. Note that the expression "the absolute value of the principal curvature difference increases in a predetermined direction (e.g., one direction)" means that the astigmatic axis $Ax_β$ has a predetermined value (e.g., only one value exists). In one aspect of the present invention, a case is illustrated where, of directions that the two principal curvatures take, the above-described absolute value increases in a direction extending from the upper side to the lower side of the progressive power lens (including an oblique direction, also referred to as a direction extending from the distance portion to the near portion).

According to one aspect of the present invention, it is possible to provide a technique that enables an astigmatic power and an astigmatic axis suitable for near vision to be freely set.

<Preferred Examples and Modifications of Designing Method of Progressive Power Lens According to One Aspect of the Present Invention>

The technical scope of the present invention is not limited to the embodiments described above, but includes various changes and modifications as far as specific effects achieved by the constituent elements of the invention and combinations thereof can be derived.

Although there is no limitation on the order of the astigmatism α adding step and the astigmatism β adding step, a case where the astigmatism β adding step is performed first is illustrated in one aspect of the present invention.

Preferably, before the astigmatism α adding step and the astigmatism β adding step, an astigmatism β obtaining step of obtaining an astigmatism β is performed. Note that each of the following steps is a specific example of the astigmatism β obtaining step, and is also a specific example that constitutes a designing method of a progressive power lens according to one aspect of the present invention.

Preferably, a designing method of a progressive power lens according to one aspect of the present invention include:

a preparation step of preparing a basic progressive surface including the distance portion, the near portion, and the intermediate portion before the distance portion, the near portion, and the intermediate portion are each provided with a power for astigmatism correction; and a calculation step of subtracting the distance prescription values of the distance portion from the near prescription values of the near portion by vector subtraction, to calculate a spherical power $S_{β1}$, an astigmatic power $C_{β1}$, and an astigmatic axis $Ax_{β1}$, wherein, if an increasing/decreasing direction T, obtained by subtracting 90 degrees from the astigmatic axis $Ax_{β1}$ (if the increasing/decreasing direction T is less than 0 degrees, a value obtained by adding 180 degrees thereto), of the astigmatic power is outside a range of 45 to 135 degrees, a conversion step of converting $S_{β1}$ and $C_{β1}$ into a state in which a value of the astigmatic axis $Ax_{β1}$ is replaced with a value of the increasing/decreasing direction T of the astigmatic power, to calculate a post-conversion spherical power $S_{β2}$ and a post-conversion astigmatic power $C_{β2}$ is performed, and $S_{β2}$ is set to $S_β$, $C_{β2}$ is set to $C_β$, and $Ax_{β1}$ is set to $Ax_β$, and, if the increasing/decreasing direction T, obtained by subtracting 90 degrees from the astigmatic axis $Ax_{β1}$ (if the increasing/decreasing direction T is less than 0 degrees, a value obtained by adding 180 degrees thereto), of the astigmatic power is in the range of 45 to 135 degrees, $S_{β1}$ is set to $S_β$, $C_{β1}$ is set to $C_β$, and $Ax_{β1}$ is set to $Ax_β$, and, after performing a set β obtaining step of obtaining a set β having a curvature distribution that has one astigmatic axis $Ax_β$, and in which a spherical power increases from a spherical power 0 D to a spherical power $S_β$, and an astigmatic power increases from an astigmatic power 0 D to an astigmatic power $C_β$, the set α adding step and the set β adding step are performed on the basic progressive surface.

In the preparation step, a basic progressive surface according to the distance prescription values and the near prescription values of a wearer is prepared. Since the basic progressive surface has been described in <Definitions>, the description thereof is omitted here.

In the calculation step, it is preferable that the distance prescription values of the distance portion are subtracted from the near prescription values of the near portion by vector subtraction, to calculate a spherical power $S_{β1}$, an astigmatic power $C_{β1}$, and an astigmatic axis $Ax_{β1}$. In the following, actual vector subtractions will be shown using Example 1 described below.

A spherical power $S_F$, an astigmatic power $C_F$, and an astigmatic axis $Ax_F$ that are distance prescription values required for far vision are decomposed into sectional powers in four directions of $D1_F$ to $D4_F$.

A spherical power $S_N$, an astigmatic power $C_N$, and an astigmatic axis $Ax_N$ that are distance prescription values required for near vision are also decomposed into sectional powers in four directions of $D1_N$ to $D4_N$.

D1 to D4 are represented by the following expressions:

$$D1 = Sph + Cyl \cdot \sin^2(0 - Axis) \quad \text{[Math. 1]}$$
$$= Sph + Cyl \cdot (\sin 0 \cdot cosAxis - \cos 0 \cdot sinAxis)^2$$
$$= Sph + Cyl \cdot (-sinAxis)^2$$
$$= Sph + Cyl \cdot \sin^2 Axis$$

$$D2 = Sph + Cyl \cdot \sin^2(45 - Axis)$$
$$= Sph + Cyl \cdot (\sin 45 \cdot cosAxis - \cos 45 \cdot sinAxis)^2$$
$$= Sph + Cyl \cdot \left(\frac{1}{\sqrt{2}} \cdot cosAxis - \frac{1}{\sqrt{2}} \cdot sinAxis\right)^2$$
$$= Sph + Cyl \cdot \frac{(cosAxis - sinAxis)^2}{2}$$

$$D3 = Sph + Cyl \cdot \sin^2(90 - Axis)$$
$$= Sph + Cyl \cdot (\sin 90 \cdot cosAxis - \cos 90 \cdot sinAxis)^2$$
$$= Sph + Cyl \cdot (cosAxis)^2$$
$$= Sph + Cyl \cdot \cos^2 Axis$$

$$D4 = Sph + Cyl \cdot \sin^2(135 - Axis)$$
$$= Sph + Cyl \cdot (\sin 135 \cdot cosAxis - \cos 135 \cdot sinAxis)^2$$
$$= Sph + Cyl \cdot \left(\frac{1}{\sqrt{2}} \cdot cosAxis + \frac{1}{\sqrt{2}} \cdot sinAxis\right)^2$$
$$= Sph + Cyl \cdot \frac{(cosAxis + sinAxis)^2}{2}$$

Assuming that $S_F$ is 0.00 D (0 D), $C_F$ is −1.00 D, and the astigmatic axis $Ax_F$ is 180 degrees, $D1_F$ is 0.00 D (0 D), $D2_F$ is −0.50 D, $D3_F$ is −1.00 D, and $D4_F$ is −0.50 D.

Assuming that $S_N$ is 2.00 D, $C_N$ is −1.00 D, and the astigmatic axis $Ax_N$ is 30 degrees, $D1_N$ is 1.75 D, $D2_N$ is 1.93 D, $D3_N$ is 1.25 D, and $D4_N$ is 1.07 D.

In that case, for the powers D1 to D4 added to the near portion, $D1=D1_N-D1_F=1.75$ D, $D2=D2_N-D2_F=2.43$ D, $D3 D_N-D3_F$ 2.25 D, and $D4=D4_N-D4_F=1.57$ D hold.

Then, D1 to D4 are inversely converted into S, C, and Ax. As a result, the spherical power $S_{β1}$ 32 2.50 D, the astigmatic power $C_{β1}=-1.00$ D, and the astigmatic axis $Ax_{β1}=60$ degrees.

That is, in the calculation step, it is preferable to perform the following operations.

Decomposing the distance prescription values required for far vision into sectional powers in four directions of $D1_F$ to $D4_F$.

Decomposing the near prescription values required for near vision into sectional powers in four directions of $D1_N$ to $D4_N$, Subtracting the far vision sectional powers in four directions from the near vision sectional powers in four directions, to obtain D1 to D4.

Inversely converting D1 to D4 into S, C, and Ax, to obtain $S_{β1}$, $C_{β1}$, and $Ax_{β1}$.

Note that as for a simulation using interpolation of the sectional powers in four directions, the descriptions in [Claim 6] and [0014] of JP 2005-326294 may be used.

It is preferable to use a determination step of determining whether or not an increasing/decreasing direction T, obtained by subtracting 90 degrees from the astigmatic axis $Ax_{β1}$ (if the increasing/decreasing direction T is less than 0 degrees, a value obtained by adding 180 degrees thereto), of the astigmatic power is in the range of 45 to 135 degrees. The reason for this will now be described.

Figure 4:
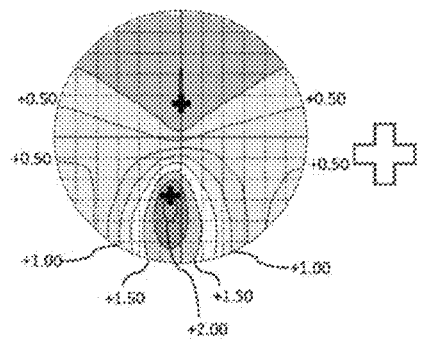
FIG. 4 is a diagram for illustrating technical significances of a determination step and a conversion step.
Figure 4:
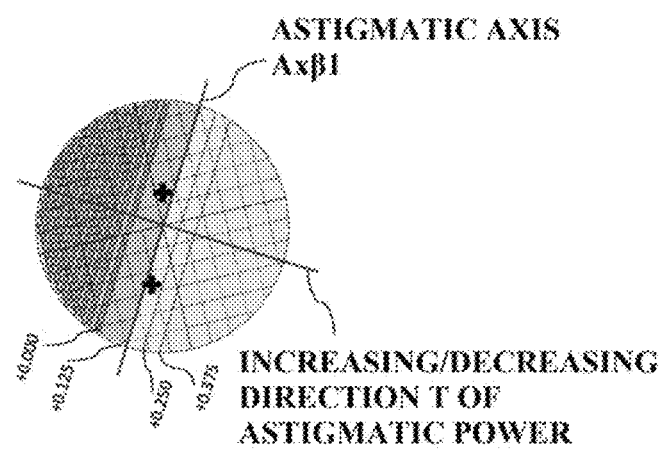
Figure 4:
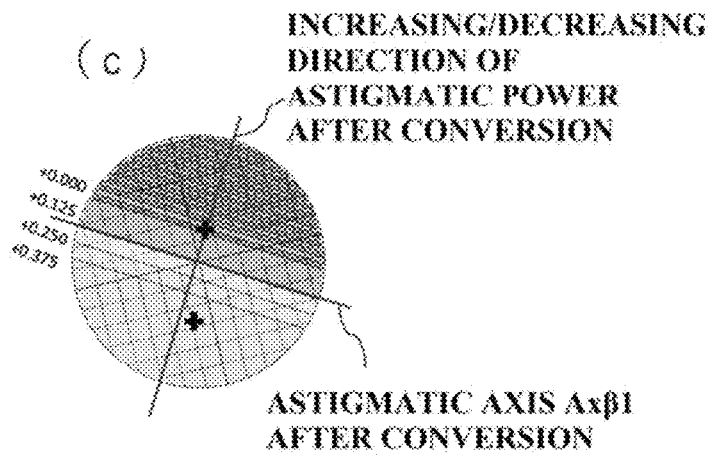

FIG. 4 is a diagram for illustrating technical significances of the determination step and the conversion step. (a) of FIG. 4 is an average refractive power distribution of the basic progressive surface, (b) of FIG. 4 is an average refractive power distribution when there is no determination step, and the astigmatic axis $Ax_{\beta1}$ 80 degrees, or in other words, the increasing/decreasing direction of the astigmatic power is 170 degrees, and (c) of FIG. 4 is an average refractive power distribution after the conversion step has been performed after the determination step.

The tipper cross in (a) of FIG. 4 is the measurement point F, and the lower cross is the measurement point N. Assuming that the increasing/decreasing direction of the astigmatic power is 170 degrees, there is almost no refractive power difference between the measurement point F and the measurement point N as shown in (b) of FIG. 4. Even if the astigmatism corresponding to (b) of FIG. 4 is added to the basic progressive surface in this state, the finally obtained lens does not embody a progressive power lens.

Even if the increasing/decreasing direction T of the astigmatic power is outside the range of 45 to 135 degrees, a conversion step of converting $S_{\beta1}$ and $C_{\beta1}$ into a state in which a value of the astigmatic axis $Ax_{\beta1}$ is replaced with a value of the increasing/decreasing direction T of the astigmatic power may be performed. Through the conversion step, a post-conversion spherical power $S_{\beta2}$ and a post-conversion astigmatic power $C_{\beta2}$ are calculated.

Given the state in which a value of the astigmatic axis $Ax_{\beta1}$ is replaced with a value of the increasing/decreasing direction T of the astigmatic power in the conversion step, the state shown in (c) of FIG. 4 is brought about, and the situation shown in (b) of FIG. 4 can be avoided. In addition, $S_{\beta1}$ and $C_{\beta1}$ are converted into the above-described state. This conversion can be easily performed using $S_{\beta2}=S_{\beta1}+C_{\beta1}$, $C_{\beta2}=-C_{\beta1}$.

If there is a difference between $S_{\beta2}$ and $S_{\beta1}$, it is preferable to perform adjustment for making up for the difference by a change in refractive power in the average refractive power distribution caused by the set β, thereby eventually obtaining a power that matches the prescription value. In view of this, the curvature distribution of the set β (k1β, k2β) of two principal curvatures having different sizes that provides the astigmatism β can also be called a distribution in which the power change progressively.

On the other hand, if the increasing/decreasing direction of the astigmatic power is in the range of 45 to 135 degrees in the determination step, $S_{\beta1}$ is set to $S_\beta$, $C_{\beta1}$ is set to $C_\beta$, and $Ax_{\beta1}$ is set to $Ax_\beta$.

To summarize the above-described content, it is preferable to set $Ax_\beta$, $S_\beta$, and $C_\beta$ according to one of (1) and (2) below (1) If an increasing/decreasing direction T, obtained by subtracting 90 degrees from the astigmatic axis $Ax_{\beta1}$ (if the increasing/decreasing direction T is less than 0 degrees, a value obtained by adding 180 degrees thereto), of the astigmatic power is outside a range of 45 to 135 degrees, $S_{\beta1}$ and $C_{\beta1}$ are converted into a state in which a value of the astigmatic axis $Ax_{\beta1}$ is replaced with a value of the increasing/decreasing direction T of the astigmatic power, to calculate a post-conversion spherical power $S_{\beta2}$ and a post-conversion astigmatic power $C_{\beta2}$, and $S_{\beta2}$ is set to $S_\beta$, $C_{\beta2}$ is set to $C_\beta$, and $Ax_{\beta1}$ is set to $Ax_\beta$.

(2) If the increasing/decreasing direction T, obtained by subtracting 90 degrees from the astigmatic axis $Ax_{\beta1}$ (if the increasing/decreasing direction T is less than 0 degrees, a value obtained by adding 180 degrees thereto), of the astigmatic power is in the range of 45 to 135 degrees, $S_{\beta1}$ is set to $S_\beta$, $C_{\beta1}$ is set to $C_\beta$, and $Ax_{\beta1}$ is set to $Ax_\beta$.

Preferably, the astigmatism β provided by $S_\beta$, $C_\beta$, and $Ax_\beta$ is obtained as follows.

A preferred example of the distribution in which the spherical power increases from a spherical power 0 D to a spherical power $S_\beta$ is a distribution of an average refractive power β in which a spherical power 0 D is set at the position of the measurement point F, and a spherical power $S_\beta$ is set at the position of the measurement point N.

A preferred example of the distribution in which the astigmatic power increases from an astigmatic power 0 D to an astigmatic power $C_\beta$ is a distribution of an astigmatism β in which an astigmatic power 0 D is set at the position of the measurement point F, and an astigmatic power $C_\beta$ is set at the position of the measurement point N.

First, an average refractive power distribution in which the refractive power is increased from the vertically upper side to the vertically lower side is prepared. An astigmatism distribution is also prepared in the same manner ((a) of FIG. 6 described below). Then, the two distributions are rotated about an optical center OC so as to achieve an astigmatic axis $Ax_\beta$ (b) of FIG. 6 described below). Thus, a distribution of the astigmatism β is obtained.

Preferably, the astigmatism β has one astigmatic axis $Ax_\beta$. This means that, as shown in FIG. 2, the astigmatic power (astigmatism) increases or decreases in a direction T perpendicular to the astigmatic axis $Ax_\beta$, and means that contours of the astigmatism distribution are perpendicular to the increasing/decreasing direction T of the astigmatic power, and are parallel to the astigmatic axis $Ax_\beta$. That is, as in the case of the distribution of the astigmatism α, it is preferable that the astigmatic axis $Ax_\beta$ does not change in the distribution of the astigmatism β.

It is preferable to perform an astigmatism β obtaining step of obtaining an astigmatism β having a distribution that has one astigmatic axis $Ax_\beta$ (i.e., in the increasing/decreasing direction of one astigmatic power), and in which the spherical power increases from a spherical power 0 D to a spherical power $S_\beta$, and the astigmatic power increases from an astigmatic β power 0 D to an astigmatic power $C_\beta$. Thereafter, it is preferable to perform the astigmatism β adding step and the astigmatism α, adding step on the basic progressive surface.

Other preferred examples and modifications are as follows.

The absolute value of $C_N$ is preferably 2.00 D or less (more preferably less than 2.00 D), $Ax_N$ is preferably 0 degrees or more and 45 degrees or less, and more preferably 30 degrees or less (further preferably less than 30 degrees).

Preferably, the astigmatism β is not added to the distance portion, and is added to the intermediate portion and the near portion.

The expression "the astigmatism is not added to the distance portion" means that no astigmatism is added to at least the FP present in the distance portion. Preferably, the expression "the astigmatism is not added to the distance portion" means that no astigmatism is added to at least between the measurement point F and the FP (preferably the GC located further below).

The expression "the astigmatism is added to the intermediate portion and the near portion" means that the astigmatism is added to at least a part of the intermediate portion, and the astigmatism is added to at least a part of the near portion.

Preferably, in at least a portion of the distribution of the astigmatism β, the astigmatism increases as a linear function in the increasing direction of the astigmatic power. It is preferable that the astigmatism increases continuously in a range of the distribution of the astigmatism β that extends from the measurement point F to the measurement point N. In the other ranges, there is no limitation on the increase/decrease of the astigmatism.

As shown in Example 1 described below, it is preferable that contours of the distribution of the astigmatism β are straight lines that are parallel to each other, and that extend in a direction perpendicular to the increasing direction of the astigmatic power (i.e., a direction parallel to the astigmatic axis Axβ), because the astigmatism can be easily controlled when the basic progressive surface, the astigmatism α, and the astigmatism β are combined. In that case or otherwise (a case where the contours are not straight lines), it is preferable that the astigmatism increases most steeply in a direction extending from the upper side to the lower side (including an oblique direction) in the distribution of the astigmatism β.

<Specific Addition Mode of Astigmatism β>

An example of a specific mode of addition of the astigmatism β is the content described in EP 3457195A1 (hereinafter referred to as a "reference publication"). The entire content of the reference publication can be referenced in the present specification.

In one aspect of the content described in the reference publication, a transmission astigmatism is added to the intermediate portion and the near portion, rather than the distance portion, the clear vision region in the near portion is expanded (horizontal refractive power>vertical refractive power, Embodiment 1), and the skew distortion is reduced (vertical refractive power>horizontal refractive power, Embodiment 2).

In one aspect of the present invention, the addition mode, which is called Pattern 2, of the transmission astigmatism described in the reference publication can be applied. One aspect of the present invention results from expansion of the mode of Pattern 2 in a direction perpendicular to the astigmatic axis for the astigmatism 3.

Note that the reference publication neither describes nor suggests freely setting an astigmatic power and an astigmatic axis suitable for near vision.

<Progressive Power Lens According to One Aspect of the Present Invention>

The configuration of a progressive power lens according to one aspect of the present invention is as follows.

"A progressive power lens including:
a lower near portion having near prescription values for near vision for viewing a near distance;
an upper distance portion having distance prescription values for far vision for viewing a distance farther than the near distance; and
an intermediate portion having a power that changes so as to connect the distance portion and the near portion,
wherein a spherical power $S_F$, an astigmatic power $C_F$, and an astigmatic axis $Ax_F$ that are distance prescription values required for far vision are set in the distance portion and a spherical power $S_N$ (=$S_F$+addition power ADD), an astigmatic power $C_N$, and an astigmatic axis $Ax_N$ that are near prescription values required for near vision are set in the near portion,
$C_N$ is a value different from $C_F$ and/or $Ax_F$ is a value different from $Ax_N$,
$C_F$ and $Ax_F$ are achieved in the distance portion, and $C_N$ and $Ax_N$ are achieved in the near portion in a state in which:
a basic progressive surface on which no astigmatic power is set in the distance portion, the near portion, and the intermediate portion;
a curvature distribution of a set α (k1α, k2α) of two principal curvatures having different sizes that is uniformly added to the distance portion, the near portion, and the intermediate portion, and that achieves $C_F$ and $Ax_F$ in the distance portion; and
a curvature distribution of a set β (k1β, k2β) of two principal curvatures having different sizes that is different from the curvature distribution of the set α, and in which an absolute value (|k1β−k2β|) of a principal curvature difference increases in a predetermined direction,
are combined."

Using the expression "astigmatism", the progressive power lens according to one aspect of the present invention is as follows.

"A progressive power lens including:
a lower near portion having near prescription values for near vision for viewing a near distance;
an upper distance portion having distance prescription values for far vision for viewing a distance farther than the near distance; and
an intermediate portion having a power that changes so as to connect the distance portion and the near portion,
wherein a spherical power $S_F$, an astigmatic power $C_F$, and an astigmatic axis $Ax_F$ that are distance prescription values required for far vision are set in the distance portion, and a spherical power $S_N$ (=$S_F$+addition power ADD), an astigmatic power $C_N$, and an astigmatic axis $Ax_N$ that are near prescription values required for near vision are set in the near portion, $C_N$ is a value different from $C_F$ and/or $Ax_F$ is a value different from $Ax_N$,
$C_F$ and $Ax_F$ are achieved in the distance portion, and $C_N$ and $Ax_N$ are achieved in the near portion in a state in which:
a basic progressive surface on which no astigmatic power is set in the distance portion, the near portion, and the intermediate portion;
an astigmatism α that achieves $C_F$ and $Ax_F$ in the distance portion and is uniformly added to the distance portion, the near portion, and the intermediate portion; and
an astigmatism β that is different from the astigmatism α, and in which an astigmatism increases in a predetermined direction,
are combined.

Since the above-described configuration has already been described in <Designing Method of Progressive Power Lens According to One Aspect of the Present Invention>, repeated description thereof is omitted. The content described in <Preferred Examples and Modifications of Designing Method of Progressive Power Lens According to One Aspect of the Present Invention> (in particular, the procedure for determining $S_β$, $C_β$, and $Ax_β$) is also applicable to the progressive power lens.

Example

Next, the present invention will be specifically described by way of an example. Of course, the present invention is not limited to the following example.

Example 1

Figure 5:
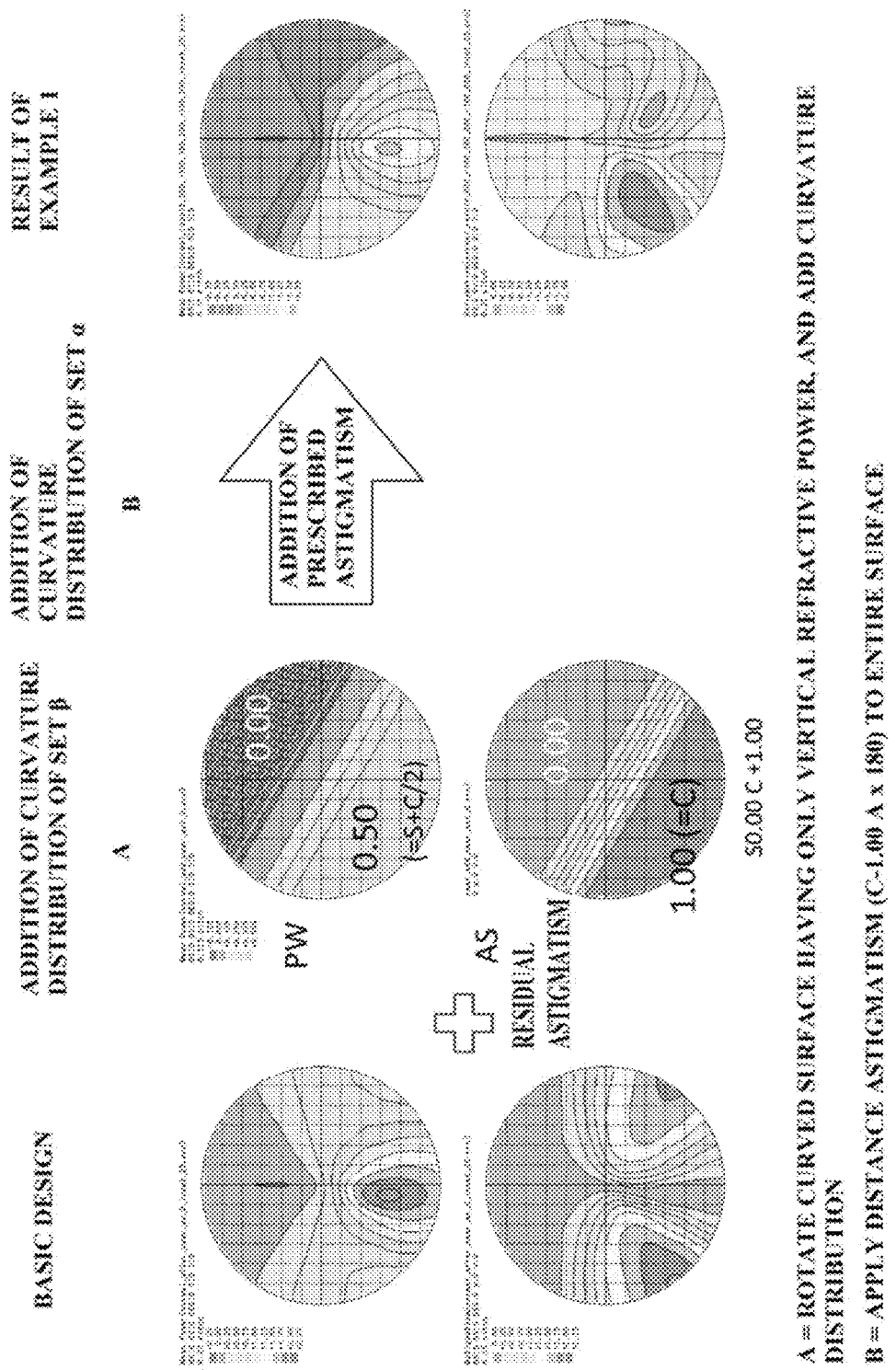
FIG. 5 is an explanatory diagram illustrating the designing method of the progressive power lens according to Example 1.

FIG. 5 is an explanatory diagram of a designing method of a progressive power lens according to Example 1.

The distributions on the upper side are average refractive power distributions, and the distributions on the lower side are astigmatism distributions. The distributions of a basic progressive surface are shown on the leftmost side, the astigmatism β (the lower map) and the average refractive power distribution (the upper map) resulting therefrom are shown on the right side of the leftmost side, and the distributions after the astigmatism α adding step and the astigmatism β adding step have been performed are shown on the rightmost side.

In Example 1, the distance prescription values are set as follows.

$S_F$: 0.00 D (0 D)
$C_F$: −1.00 D
$Ax_F$: 180 degrees

The near prescription values are set as follows.

$S_N$: 200 D (i.e., ADD: 2.00 D)
$C_N$: −1.00 D
$Ax_N$: 30 degrees

The result of performing the calculation step of subtracting the distance prescription values of the distance portion from the near prescription values of the near portion by vector subtraction is as follows.

$S_{β1}$: 2.50 D
$C_{β1}$: −1.00 D
$Ax_{β1}$: 60 degrees

Figure 6:
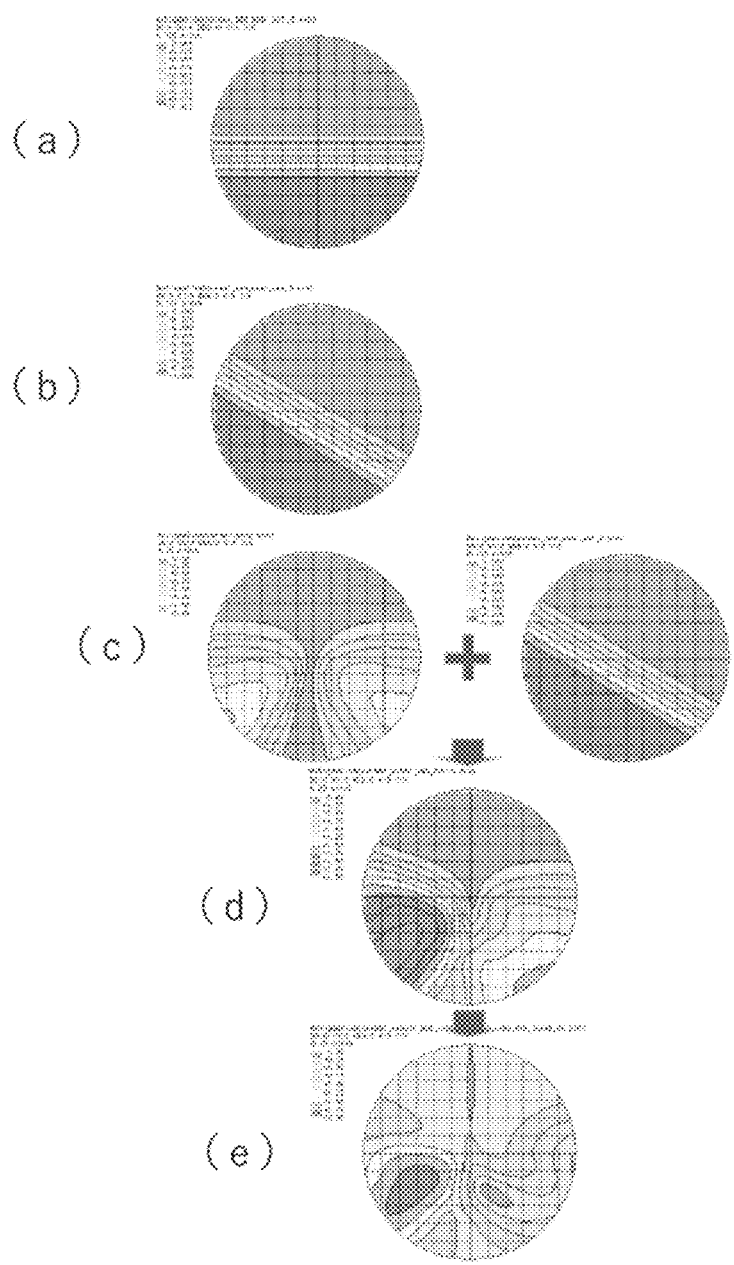
FIG. 6 is an explanatory diagram illustrating the designing method of the progressive power lens according to Example 1, focusing on preparing a distribution of an astigmatism

FIG. 6 is an explanatory diagram illustrating the designing method of the progressive power lens according to Example 1, focusing on preparing a distribution of an astigmatism β.

(a) of FIG. 6 is a distribution in which the astigmatism is 0 D at the measurement point F, the astigmatism is 1.00 D at the measurement point N, the astigmatism is increased from the vertically upper side to the vertically lower side, and the contours are horizontal lines.

(b) of FIG. 6 is a diagram showing a state in which the distribution of (a) of FIG. 6 is rotated about the optical center OC so as to achieve an astigmatic axis $Ax_β$. (c) of FIG. 6 is an astigmatism distribution of the basic progressive surface. In order to adjust the difference between $S_{β2}$ and $S_{β1}$, the ADD on the basic progressive surface is set to 1.50 D.

(d) of FIG. 6 is an astigmatism distribution after the astigmatism β adding step has been performed on (c) of FIG. 6 and before the astigmatism α adding step is performed.

(e) of FIG. 6 is an astigmatism distribution after the astigmatism α adding step has been performed on (d) of FIG. 6, and is the same as the lower map on the rightmost side of FIG. 5.

In Example 1, an increasing/decreasing direction T, obtained by subtracting 90 degrees from the astigmatic axis $Ax_{β1}$ (if the increasing/decreasing direction T is less than 0 degrees, a value obtained by adding 180 degrees thereto), of the astigmatic power is 150 degrees, and is outside the range of 45 to 135 degrees (determination step). A conversion step of converting the $S_{β1}$ and $C_{β1}$ into a state in which the value of the astigmatic axis $Ax_{β1}$ is replaced with the value of the increasing/decreasing direction T of the astigmatic power was performed. In the replaced state, the astigmatic axis is 150 degrees, and the increasing/decreasing direction of the astigmatic power is 60 degrees. Through the conversion step, the following values were obtained.

$S_{β2}$: 1.50 D
$C_{β2}$: 1.00 D $S_{β2}$ was set to $S_β$, $C_{β2}$ was set to $C_β$, and $Ax_{β1}$ was set to $Ax_β$. That is, in the distribution of the astigmatism β in Example 1, the refractive power and the astigmatism increase toward a −120-degree direction (from the upper right side to the lower left side), which is a direction opposite to a 60-degree direction.

Note that a state in which the astigmatism increases toward the −120-degree direction (from the upper side to the lower side) (i.e., the increasing/decreasing direction of the astigmatic power is 60 degrees) is shown in (b) of FIG. 6. (b) FIG. 6 is a distribution resulting from tilting, −30 degrees about the optical center OC, an astigmatism distribution in which the astigmatism has been increased toward the vertically lower side.

Then, an average refractive power distribution and an astigmatism distribution were set that have one astigmatic axis $Ax_β$, and in which the refractive power increases from a spherical power 0 D at the measurement point F to a spherical power $S_β$ at the measurement point N, and the astigmatism increases from an astigmatic power 0 D at the measurement point F to an astigmatic power $C_β$ at the measurement point N.

As the astigmatism α, a distribution in which $C_N$ was −1.00 D and $Ax_N$ was 30 degrees was prepared. The astigmatism distribution is uniform over the entire lens surface, and therefore the illustration thereof has been omitted.

The distribution maps on the rightmost side of FIG. 5 are obtained as a result of adding the astigmatism α and the astigmatism β to the basic progressive surface.

FIG. 7 is an explanatory diagram showing that the progressive power lens obtained in Example 1 has achieved distance prescription values and near prescription values.

The distributions on the upper side are average refractive power distributions, and the distributions on the lower side are astigmatism distributions. The distributions of the progressive power lens obtained in Example 1 are shown on the leftmost side, the distributions obtained when subtracting the distance prescription values from the progressive power lens obtained in Example 1 are shown on the right side of the leftmost side, and the distributions obtained when subtracting the near prescription values from the progressive power lens obtained in Example 1 are shown on the rightmost side.

As shown in FIG. 7, it can be seen that, when the distance prescription values are subtracted from the progressive power lens obtained in the Example 1, the distance portion embodies a progressive power lens, and can be secured so as to be substantially as wide as that of the basic progressive surface. It can also be seen that, when the near prescription values are subtracted from the progressive power lens obtained in Example 1, the near portion embodies a progressive power lens, and can be secured so as to be substantially as wide as that of the basic progressive surface.

The invention claimed is:

1. A progressive power lens comprising:
   a lower near portion having near prescription values for near vision for viewing a near distance;
   an upper distance portion having distance prescription values for far vision for viewing a distance farther than the near distance; and
   an intermediate portion having a power that changes so as to connect the distance portion and the near portion,
   wherein a spherical power $S_F$, an astigmatic power $C_F$, and an astigmatic axis $Ax_F$ that are distance prescription values required for far vision are set in the distance portion, and a spherical power $S_N$ (=$S_F$+addition power ADD), an astigmatic power $C_N$, and an astigmatic axis $Ax_N$ that are near prescription values required for near vision are set in the near portion, $C_N$ is a value different from $C_F$ and/or $Ax_F$ is a value different from $Ax_N$, $C_F$ and $Ax_F$ are achieved in the distance portion, and $C_N$ and $Ax_N$ are achieved in the near portion in a state in which:

a basic progressive surface on which no astigmatic power is set in the distance portion, the near portion, and the intermediate portion;

a curvature distribution of a set α (k1α, k2α) of two principal curvatures having different sizes that is uniformly added to the distance portion, the near portion, and the intermediate portion, and that achieves $C_F$ and $Ax_F$ in the distance portion; and a curvature distribution of a set β (k1β, k2β) of two principal curvatures having different sizes that is different from the curvature distribution of the set α, and in which an absolute value (|k1β−k2β|) of a principal curvature difference increases in a predetermined direction, are combined, wherein the set β has a distribution that has one astigmatic axis $Ax_β$, and in which a spherical power increases from a spherical power 0 D to a spherical power $S_β$, and an astigmatic power increases from an astigmatic power 0 D to an astigmatic power $C_β$, and $S_β$, $C_β$, and $Ax_β$ are determined by the following procedures:

[Procedure 1]

the distance prescription values of the distance portion are subtracted from the near prescription values of the near portion by vector subtraction, to calculate a spherical power $S_{β1}$, an astigmatic power $C_{β1}$, and an astigmatic axis $Ax_{β1}$; and

[Procedure 2]

(1) if an increasing/decreasing direction T, obtained by subtracting 90 degrees from the astigmatic axis $Ax_{β1}$ (if the increasing/decreasing direction T is less than 0 degrees, a value obtained by adding 180 degrees thereto), of the astigmatic power is outside a range of 45 to 135 degrees, $S_{β1}$ and $C_{β1}$ are converted into a state in which a value of the astigmatic axis $Ax_{β1}$ is replaced with a value of the increasing/decreasing direction T of the astigmatic power, to calculate a post-conversion spherical power $S_{β2}$ and a post-conversion astigmatic power $C_{β2}$, and $S_{β2}$ is set to $S_β$, $C_{β2}$ is set to $C_β$, and $Ax_{β1}$ is set to $Ax_β$, and (2) if the increasing/decreasing direction T, obtained by subtracting 90 degrees from the astigmatic axis $Ax_{β1}$ (if the increasing/decreasing direction T is less than 0 degrees, a value obtained by adding 180 degrees thereto), of the astigmatic power is in the range of 45 to 135 degrees, $S_{β1}$ is set to $S_β$, $C_{β1}$ is set to $C_β$, and $Ax_{β1}$ is set to $Ax_β$.

2. A designing method of a progressive power lens including:

a lower near portion having near prescription values for near vision for viewing a near distance;

an upper distance portion having distance prescription values for far vision for viewing a distance farther than the near distance; and an intermediate portion having a power that changes so as to connect the distance portion and the near portion, wherein a spherical power $S_F$, an astigmatic power $C_F$, and an astigmatic axis $Ax_F$ that are distance prescription values required for far vision are set in the distance portion, and a spherical power $S_N$ (=$S_F$+addition power ADD), an astigmatic power $C_N$, and an astigmatic axis $Ax_N$ that are near prescription values required for near vision are set in the near portion, and $C_N$ is a value different from $C_F$ and/or $Ax_F$ is a value different from $Ax_N$, the designing method comprising:

a set α adding step of uniformly adding, to the distance portion, the near portion, and the intermediate portion, a curvature distribution of a set α (k1α, k2α) of two principal curvatures having different sizes that achieves $C_F$ and $Ax_F$ in the distance portion; and a set β adding step of adding a curvature distribution of a set β (k1β, k2β) of two principal curvatures having different sizes that is different from the curvature distribution of the set α, and in which an absolute value (|k1β−k2β|) of a principal curvature difference increases in a predetermined direction, wherein, after the set α adding step and the set β adding step have been performed on a basic progressive surface on which no astigmatic power is set in the distance portion, the near portion, and the intermediate portion, the set β has a curvature distribution that is capable of achieving $C_F$ and $Ax_F$ in the distance portion, and capable of achieving $C_N$ and $Ax_N$ in the near portion.

3. The designing method of a progressive power lens according to claim 2, further comprising, before the set α adding step and the set β adding step, a preparation step of preparing a basic progressive surface including the distance portion, the near portion, and the intermediate portion before the distance portion, the near portion, and the intermediate portion are each provided with a power for astigmatism correction; and a calculation step of subtracting the distance prescription values of the distance portion from the near prescription values of the near portion by vector subtraction, to calculate a spherical power $S_{β1}$, an astigmatic power $C_{β1}$, and an astigmatic axis $Ax_{β1}$, wherein, if an increasing/decreasing direction T, obtained by subtracting 90 degrees from the astigmatic axis $Ax_{β1}$ (if the increasing/decreasing direction T is less than 0 degrees, a value obtained by adding 180 degrees thereto), of the astigmatic power is outside a range of 45 to 135 degrees, a conversion step of converting $S_{β1}$ and $C_{β1}$ into a state in which a value of the astigmatic axis $Ax_{β1}$ is replaced with a value of the increasing/decreasing direction T of the astigmatic power, to calculate a post-conversion spherical power $S_{β2}$ and a post-conversion astigmatic power $C_{β2}$ is performed, and $S_{β2}$ is set to $S_β$, $C_{β2}$ is set to $C_β$, and $Ax_{β1}$ is set to $Ax_β$, and, if the increasing/decreasing direction T, obtained by subtracting 90 degrees from the astigmatic axis $Ax_{β1}$ (if the increasing/decreasing direction T is less than 0 degrees, a value obtained by adding 180 degrees thereto), of the astigmatic power is in the range of 45 to 135 degrees, $S_{β1}$ is set to $S_β$, $C_{β1}$ is set to $C_β$, and $Ax_{β1}$ is set to $Ax_β$, and, after performing a set β obtaining step of obtaining a set β having a curvature distribution that has one astigmatic axis $Ax_β$, and in which a spherical power increases from a spherical power 0 D to a spherical power $S_β$, and an astigmatic power increases from an astigmatic power 0 D to an astigmatic power $C_β$, the set α adding step and the set β adding step are performed on the basic progressive surface.

4. The method for designing a progressive power lens according to claim 2, wherein, after the set β adding step, the set α adding step is performed.

5. The method for designing a progressive power lens according to claim 3,
wherein, after the set β adding step, the set α adding step is performed.

* * * * *